May 23, 1939. O. W. LEE 2,159,277
METHOD OF AND APPARATUS FOR DETERMINING PUPILLARY DISTANCE
Filed Sept. 28, 1934 2 Sheets-Sheet 1
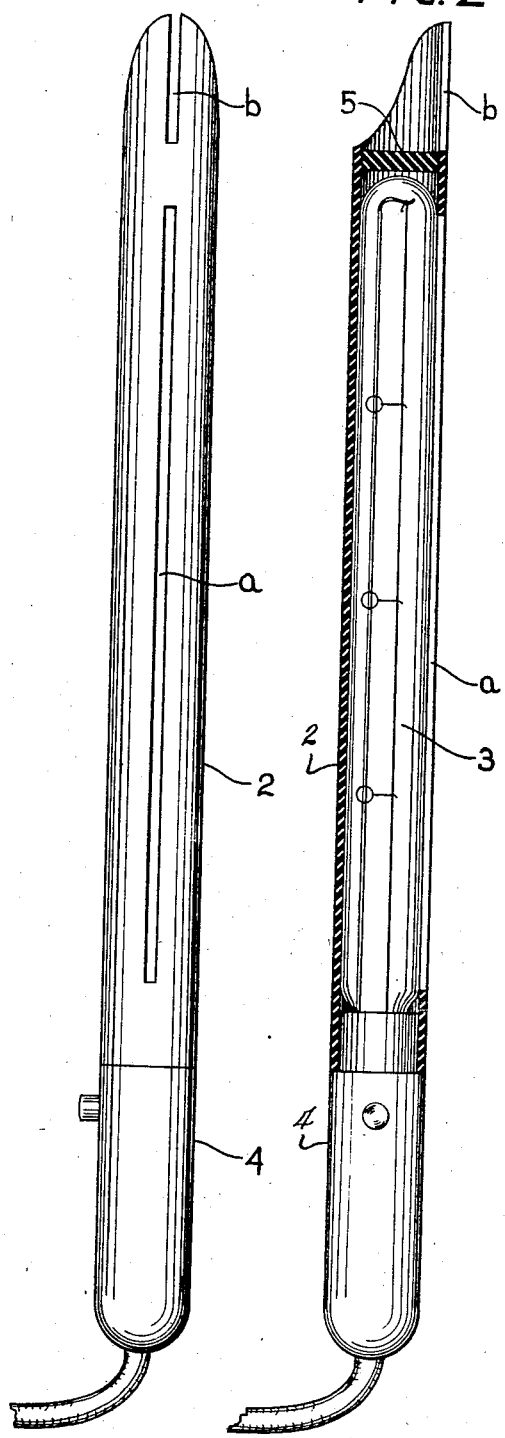
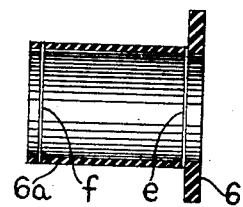
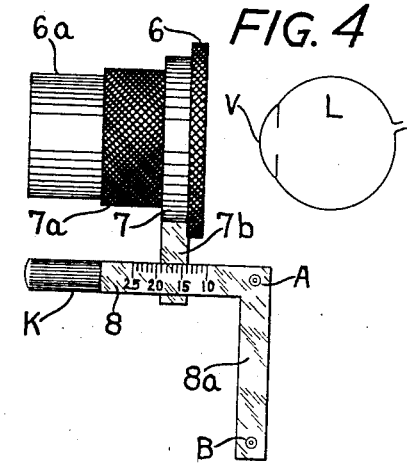
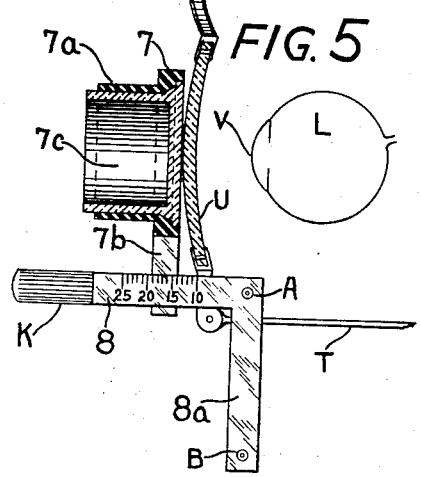
INVENTOR
Orval W. Lee May 23, 1939.　　　　　O. W. LEE　　　　　2,159,277
METHOD OF AND APPARATUS FOR DETERMINING PUPILLARY DISTANCE
Filed Sept. 28, 1934　　　2 Sheets-Sheet 2
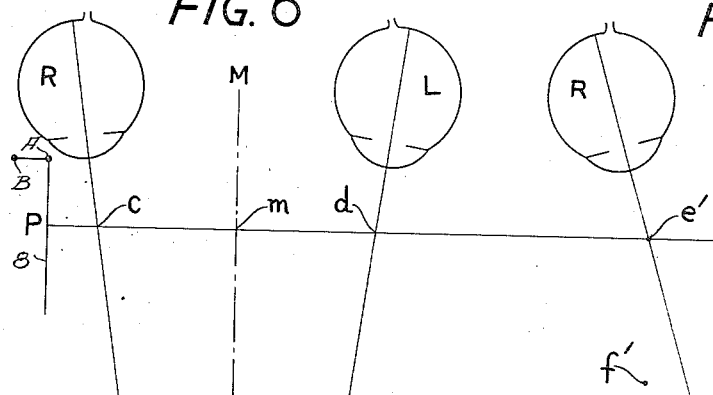
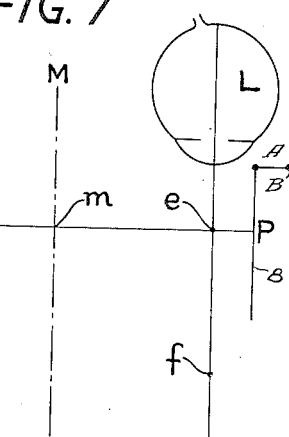
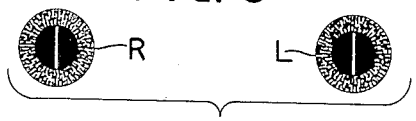
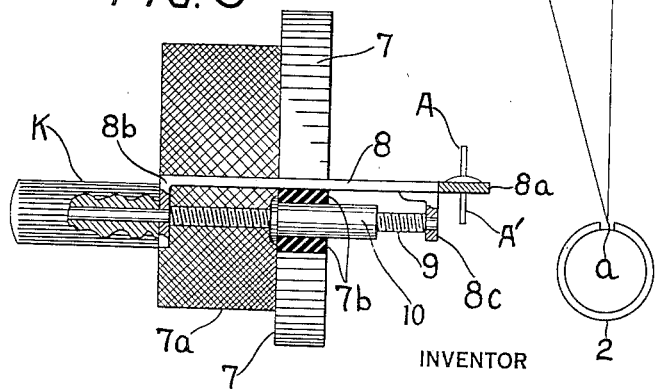
INVENTOR
Orval W. Lee Patented May 23, 1939

2,159,277

UNITED STATES PATENT OFFICE 2,159,277

METHOD OF AND APPARATUS FOR DETERMINING PUPILLARY DISTANCE

Orval W. Lee, Spokane, Wash.

Application September 28, 1934, Serial No. 745,877

22 Claims. (Cl. 88—20)

The present invention relates to improvements in the methods of and apparatus for determining pupillary distance in ophthalmic practice. My improved method involves the principle of producing an illuminated reflex on the cornea of the human eye and in making the required pupillary measurements from said reflex.

Means are provided whereby the incident rays; the reflected rays; the visual axis of the operator; and the visual axis of the patient; are all situated in the same vertical plane. The measurements are made relative to this coincident plane, which assures accuracy.

I provide means and methods whereby the interpupillary distance may be accurately determined at any required convergence; and whereby the intersection of the visual axis with a lens may be accurately located.

Means are provided to enable the operator to make the measurements at any predetermined distance from the vertex of the cornea; together with apparatus for measuring the distance from the vertex of the cornea. The same apparatus may be used to measure the distance between the vertex of the cornea and the vertex of the ophthalmic lenses of the finished glasses, which assures uniformity of measurements.

The method is simple and can be expeditiously employed. The apparatus is small and uncomplicated; whereby it may be employed with facility and the measurements accurately made in a minimum of time.

The invention consists of improved methods, together with certain novel combinations and arrangements of parts as will hereinafter be more fully set forth and claimed. It will be understood that the invention is not restricted to the exact structures herein illustrated and described, but that modifications may be made in the disclosed structures without departing from the principles of the invention and the intent of the claims. The physical embodiments of my invention are illustrated in the accompanying drawings.

Figure 1 is a front elevation of my improved means for providing a reflected image on the cornea.

Figure 2 is a side view of Figure 1, partly in section, disclosing the lamp in its slit sheath.

Figure 3 is a sectional view of one of the sight tubes.

Figure 4 is a top plan view of my improved gauge, assembled on the sight-tube shown in Figure 3; and diagrammatically illustrates the method of measuring the distance between the cornea and the sight nearest thereto.

Figure 5 is a top plan view, partly in section, of my improved gauge assembled with an interchangeable member; and diagrammatically illustrates the method of measuring the distance between the cornea and the lens of the finished glasses.

Figure 6 diagrammatically illustrates the method of determining the pupillary distance at a determinate convergence.

Figure 7 diagrammatically illustrates the method of determining the pupillary distance at parallelism and at a determinate convergence, simultaneously.

Figure 8 shows the reflected images on a pair of corneas, from which the measurements are made.

Figure 9 is a side view, partly in section of my improved gauge and discloses the means for retaining the same in its guide.

According to the prior art, measurements are made with reference to the center of the pupil. Anisocoria, malformation of the pupil, malposition of the pupil and the difficulty of accurately locating either the center of the pupil or the margin thereof renders the various prior methods more or less inaccurate.

According to my improved method, the measurements are more properly made with reference to the visual axis, irrespective of the pupillary center. The measurements are made with reference to that point at which the visual axis of each eye intersects a plane situated at a predetermined distance from the vertex of the cornea.

In carrying out my invention I provide a luminous area of sufficient dimensions to produce a readily visible reflection on the surface of the cornea. Preferably the image on the cornea is a vertical line without appreciable width, to assure accuracy of the measurements without regard to the width of said image. My experience and experiments show that the length of the image can be increased without producing a volume of illumination that would otherwise be annoying and uncomfortable to the patient.

In Figure 1, I show a preferred embodiment of my improved means for providing the required image on the cornea. As seen in this figure, the device comprises a tubular sleeve 2 having a longitudinal slit (a) of substantial length; say six inches; and the upper continuance (b) of said slit, serves as a peep sight through which the observations are made. As shown in Figure 2, a suitable luminary 3 is contained within the tubular sleeve 2. The luminary 3 may be a tubular incandescent having the conventional filament or I may use a tube of electro-conductive gas requiring no filament. The necessary means to connect the luminary to an electric circuit is of course provided as is also a convenient switch. The handle 4 provides means for grasping the device; and the septum 5 closes the upper end of the light chamber, above which point a portion of the tube 2 is cut away to afford accessibility to the sight (b).

When the device is connected with an electric circuit the slit (a) becomes a luminous line, of say two millimeters width. When said luminous line is positioned before a pair of eyes, a reflected image will be seen on the cornea of each eye as is shown in Figure 8. In this figure, I show a pair of images, one on each of two eyes; for convenience of illustration, only the iris and pupil of each eye are shown, as other portions are not essential to the present purpose. From this figure it will be readily seen that it would be a comparatively simple procedure to measure the distance between the two images with any convenient scale or rule and that when this simple procedure is employed the results would be more accurate and definite than any attempt to measure from center to center of the pupils; or from edge to edge, as is the conventional custom. In the absence of the reflected image, the center of the pupil can only be approximated; and in persons with dark irides it is difficult to definitely locate the edge of the pupil.

The required measurements are made for the purpose of accurately locating the lens in proper position before each eye and the measurements should be made with greater precision than is afforded by simple measurement with a rule, without regard to the plane in which the measurement is taken.

The importance of the proper location of the lens with relation to the eye is well established. The distance of the lenses from the vertex of the cornea is important, both in the finished glasses and during the examination, as is also the relation of the center of each lens to the visual axis of each eye.

Lenses are sometimes positioned relative to the geometrical center and sometimes relative to the optical center, when for sufficient reasons the geometrical center and optical center are not coincident; and it will of course be understood that in the following description, center refers to either the geometrical center or optical center as the case may be.

In Figure 6, I show a right eye R and a left eye L, each situated an equal distance from the median line M. The lamp in its slit sleeve is spaced at some distance in front of the eyes R and L and situated on the median line M. The fixation point of each of the eyes, is the luminous slit (a) of the sleeve 2, consequently the visual axis of each eye is directed towards the slit (a). The luminous slit (a) will form an image on each cornea, coincident with the visual axis of each eye and each image can be seen without lateral displacement by observing it through the slit (b) shown in Figure 1. P—P represents a vertical plane situated at a predetermined distance from the vertex of each cornea and said plane is common in Figures 6 and 7.

As seen in Figure 6, the visual axis of the right eye R intersects the plane P—P at (c) and the visual axis of the left eye L intersects the same plane at (d). The distance c—d represents the proper distance between the centers of lenses situated in the vertical plane P—P when the fixation point is situated at the distance illustrated.

It should be observed that the pupillary centers are more remote from the point of convergence (a) of the visual axis than is c and d; consequently the interpupillary distance is greater than the interaxiallary c—d. It should also be observed that the distance between the vertices of the two corneas is greater than the interaxiallary distance c—d. Obviously, in any given case with the fixation constant, the interpupillary distance is likewise constant, while the interaxiallary distance varies inversely as the distance from the vertex of the cornea. Properly, the measurement is a determination of the intersection of the visual axis with a predetermined plane and should more appropriately be referred to as interaxiallary distance when designating the interval between the two intersections and as axiallary distance when designating the interval between the median line M and each intersection independently.

In Figure 7, I show a right eye R and a left eye L, each situated an equal distance from the median line M. The lamp in its slit sleeve is spaced at some distance directly in front of the left eye L. The fixation point of each of the eyes, is the luminous slit (a) of the sleeve 2, consequently the visual axis of each eye is directed towards the slit (a). When the operator looks through the slit (b) shown in Figure 1, the visual axis of the operator lies in the same plane as the visual axis of the eye under observation, alternately one and the other. Inherently, the angle of incidence and the angle of reflection also lie in the same plane as the visual axis of each respective eye. Relative to each eye; the visual axis of the patient, the visual axis of the operator, the incident rays and the reflected rays, are all situated in the same plane; and the luminous slit (a) is reflected on the corneas of both eyes simultaneously; and the reflected image on each eye will lie in the plane of the visual axis of that eye and will appear as shown in Figure 8; and each image can be seen without lateral displacement when observed through the slit (b) shown in Figure 1. In Figure 7 it will be seen that the right eye R converges to the fixation point (a) and that the visual axis of the left eye is directed to the same fixation point without convergence. In this single situation, there is represented the total convergence required for the distance illustrated and also non-convergence or the equivalent of fixation at infinity. That is to say; twice the distance m—e is the interpupillary distance for infinity and the distance e—e' is the interaxiallary distance for convergence at the distance illustrated; when measured in the plane P—P.

In the practical application of my invention, I employ a pair of sight-tubes. As shown in Figure 3, each of these sight-tubes comprises a circular flange 6, rigid with the tube portion 6a, within which is mounted a pair of spaced sights e and f. The circular flange 6 is of the same size as the lens-cells or rings used for examination purposes and is adapted to fit in the conventional trial frame or lens holder in the same manner as the usual lenses and occupy the identical position that a lens would occupy. The sight (e) is situated in that plane from which the effective focus of each lens is measured when positioned in the lens holder or trial frame. The sight (f) is spaced at a practical distance from the sight (e) and the tube 6a is of suitable length for the required spacing of the sights.

It will be readily understood that the described sight-tubes can be positioned in the conventional trial frame and the latter adjusted to position before the eyes of a person. When so positioned the sights e and f will be situated as shown in the diagram of Figure 7. The trial frame being adjustable for pupillary distance and provided with a conventional scale as is universal in all trial frames, the separation between the sight-tubes can be regulated as required. The operator holds the luminous slit (a) vertically at any desired distance from the patient's eyes and with the device sufficiently near to his own eye to enable him to look through the slit (b). The operator then moves with the device to that position in which the sights e and f indicated in Figure 7 are aligned; an illuminated line will be reflected on the cornea and should this reflected line be not aligned with the sights e and f, the trial frame is adjusted to that position in which the aligned sights e and f will coincide with the line reflected on the cornea, when observed through the slit (b), also aligned with said sights. If each lens holder is independently adjustable, the opposite holder may be adjusted to that position where the sight (e') nearest the eye coincides with the line reflected on the cornea when the luminous slit (a) is in that position which maintains the previously described alignment in the other eye. The scale on the trial frame will then indicate the independent non-convergent pupillary distance of the left eye L, which is the distance m—e in Figure 7; when this measurement is added to the distance indicated on the scale belonging to the other lens holder, which is the distance e'—m; their sum is the interpupillary distance for the existing convergence. Should the eyes not be equally distant from the median line M, separate measurements may be made for each eye.

In case the trial frame is not independently adjustable, the total non-convergent interpupillary distance can be read from the scale when the reflected image is aligned with the sights as shown in the left eye L in Figure 7. The interaxiallary distance for any fixation distance may then be measured by simultaneously aligning the reflected image of each eye with the sight nearest the eye as indicated in Figure 6; and the measurement read direct from the scale on the trial frame.

The primary prerequisite is to establish the location of the plane in which the measurements are to be made. In Figure 4, I show a device embodying the principles of my improved method for locating said plane at a determinate distance from the vertex of the cornea. In this figure, the device is shown assembled in operative position upon the sight-tube just described. The device comprises a collar 7 carrying a sleeve 7a and is adapted to fit over the sight-tube 6a; whereby the rear face of the collar 7 lies in the same plane with the sight (e) shown in Figure 3. The arm 7b is rigid with the collar 7 and the gauge 8 is slidably adjustable in a groove in the upper side of the arm 7b. The gauge 8 is provided with an outward projection 8a carrying a pair of sights A and B; said sights are in a plane parallel to the collar 7 and consequently parallel to the flange 6, which latter structure occupies the same plane as the lenses used in the examination, when one or the other are assembled in the same lens holder or trial frame.

The gauge 8 and the projection 8a lie in the radial plane of the collar 7, whereby this plane intersects the axis of the collar or a continuation thereof, in any position of rotation. The projection 8a is of suitable length to provide an appropriate distance between the sights A and B which constitute an aiming device for locating the apex of the cornea.

As best seen in Figure 9, the gauge 8 may be moved by means of the screw 9 which is threaded through the tube 10 which is rigid with the arm 7b. Preferably, the threaded tube 10 extends a short distance rearwardly of the arm 7b to provide a longer support for the screw 9, to assure rigidness and constant alignment. The outside of the threaded tube 10, may be either fluted or ribbed to prevent it from turning with the screw. The screw 9 is provided with a stem on each end, the forward stem is pivoted in the downward projection 8b of the gauge and the rear stem is pivoted in a small bracket lug 8c attached to the underside of the gauge; whereby it will be seen that the gauge 8 is slidable in its open groove without possibility of dislodgement. The knob K is rigid with the stem of the screw 9 and it will be readily apparent that the gauge 8 carrying the sights A and B may with facility be adjusted to any required position relative to the arm 7b upon turning the knob K.

Referring again to Figure 4 where the rear surface of the collar 7 occupies the same plane as the sight (e) shown in Figure 3; it will be seen that when the sights A and B are aligned with the corneal apex V, that the rear edge of the arm 7b then indicates on the gauge 8 the distance from the vertex V of the cornea to the plane of the sight (e), in this instance 14 millimeters. Obviously, the structures shown in Figure 4 may with facility be assembled in any of the various trial frames that are in general use and positioned before the eyes as required; and the trial frame adjusted to any required distance from the vertex V of the cornea; or the trial frame may be adjusted as circumstances suggest or necessity requires and the existing distance accurately measured by turning the knob K to align the sights A and B with the vertex V of the cornea. The required pupillary measurements may then be accurately measured in this determinate plane and the examination conducted with the lenses occupying the same plane.

The sight-tube 6a and the member 7c are interchangeably engageable with the collar 7. As shown in Figure 5, the rear opening of the collar 7 has a shoulder and a taper complementary to the member 7c. It will be readily apparent that this structure facilitates alternately inserting the sight-tube 6a or the member 7c in the collar 7 and it will also be seen that the shoulder provides a stop to limit the telescoping of the member 7c with the collar 7. The member 7c serves as a filler for the collar 7 thereby closing the rear opening and providing a flush surface having the same relation to the adjusted gauge as the sight (e) when the sight-tube 6a is otherwise inserted in the collar 7. In Figure 5, I show the member 7c assemb'ed in the collar 7 and positioned in contact with the left lens U of a pair of spectacles. The sights A and B are aligned with the vertex V of the left eye L and obviously, the gauge 8 indicates the distance between the front vertex of the lens U and the vertex V of the eye, in this instance 14 millimeters as was the case in Figure 4. It is the general custom to compensate ophthalmic lenses to an effective focus measured from the rear vertex and with such lenses it is a simple procedure to determine the center thickness of the lens with any convenient caliper and then adjust the gauge a corresponding amount greater. It is practically impossible to measure directly from the rear vertex of a lens to the vertex of the cornea and the invention affords an accurate and practical means of equivalent measurement. The member 7c may be provided with a concave surface, corresponding to the lens being measured, in which case the vertex of the concave surface must necessarily lie in the same plane as the sight (e) as previously described. As shown in Figure 5, the tube portion of the member 7c, is preferably longer than the tube portion 7a of the collar 7, to facilitate disassembling the frictionally engaged parts.

As shown in Figure 5 the arm 7b is of sufficient length to provide clearance of the gauge with lenses and frames of such sizes as are in general use. As indicated in this figure the interchangeable member 7c is preferably of transparent material such as clear zylonite; and as indicated in this and other figures, the various tubes, sleeves and collars are preferably of non-metallic material. Such parts may be of opaque plastic mould material and preferably black. To facilitate handling, the collar 7 is provided with a short sleeve 7a which may be knurled and the flange 6 of each sight-tube is preferably knurled or milled to facilitate rotating the sights to vertical position. The sights e and f may be fine wires or I may use pairs of transparent discs each having a sight line thereon. The combined gauge 8 and collar 7 may be made in pairs, left and right; or as shown in Figure 9 I may extend the sights to project on both the upper and lower surface, whereby the gauge can be inverted and used on the opposite eye; in which latter case it may be similarly graduated on both sides.

Summarily, the apparatus of my invention provides an accurate means for determining the pupillary distance or interaxial distance at a predetermined distance from the vertex of the cornea, both for determinate convergence and non-convergence, simultaneously; and provides an accurate means for locating the plane in which the measurements are taken; such plane is located and such measurements are made with relation to a trial frame or lens holder in adjusted position upon the face of the patient, whereby at the conclusion of the measurements said trial frame is in proper adjusted position to conduct the examination, thereby assuring that the lenses used in the examination will occupy the correct position; and by the utilization of the same apparatus, the lenses of the finished glasses may be accurately adjusted to a position identical with the lenses used in the examination, thereby assuring uniformity of measurements by the same method and the same apparatus in all stages of the work; which combined advantages are not attainable by other methods and devices of the prior art.

In the invention herein disclosed, what I claim as new and desire to secure by Letters Patent of the United States is:

1. The method of determining the distance between the intersection of the visual axis of one eye with a predetermined plane and the intersection of the visual axis of the other eye with the same plane, when the fixation point is the same for both eyes; which comprises placing a suitable light at said fixation point, whereby a reflected image of said light is formed on the cornea of each eye aforesaid and each of said images is intersected by the vertical plane of the visual axis of that eye when observed from a vertical extension of said fixation point, then employing each of said reflected images and said fixation point as indices locating the visual axis of each of said eyes respectively, and measuring in any suitable manner the distance from the intersection of said visual axis of one eye with said predetermined plane, to the intersection of the visual axis of the other eye with said same plane.

2. The method of determining the interval between the corneal apexes of a pair of eyes; which comprises placing a suitable light at the intersection of the visual axes of said pair of eyes and observing from a vertical extension of said intersection, the location of the image of said light reflected from the cornea of each eye of said pair and measuring the distance between said reflected images.

3. The method of determining pupillary distance, interpupillary distance, axiallary distance, interaxiallary distance or the like, which comprises placing a suitable light at the fixation point of a pair of eyes, thereby to provide a reflected image on the apex of the cornea of each eye, then employing each of said reflected images as an index and measuring each of said distances in any suitably selected plane common to that pair of eyes, while sighting to said images from the same distance as said fixation point.

4. The method of locating the position of nonconvergence of the human eye; which comprises positioning before said eye, a pair of aligned sights adapted to locate a vertical plane at right angles to a vertical plane intersecting the centers of the two eyes of a pair, and aligning a suitable light with said sights, then laterally adjusting the position of said aligned sights and said light to that situation in which the corneal image of said light is aligned with said sights and said light while the visual axis of said eye is directed towards said light.

5. The method of determining the interval between the non-convergent visual axes of a pair of human eyes; which comprises placing before each eye, a pair of aligned sights adapted to locate a vertical plane at right angles to a vertical plane intersecting the centers of said pair of eyes and separately determining for each eye, that lateral position of each pair of said sights required to align the corneal reflection of a suitable light also aligned with said sights, and thereupon measuring the distance between the parallel planes occupied by the thusly aligned sights.

6. The method of simultaneously determining the interaxiallary distance of a pair of eyes at fixation and the axiallary distance of one of said eyes at non-convergence; which comprises positioning before one of said eyes, a pair of sight members adapted to locate a vertical plane at right angles to a vertical plane intersecting the centers of said pair of eyes, and positioning a sight member before the second eye of said pair, the latter sight member and the sight member nearest the first eye being disposed in a plane common to said pair of eyes, then employing a suitable light as a fixation point for said pair of eyes and laterally moving said light and said pair of sight members to align said pair of sight members and said light with the image of said light on the cornea of said first eye, then laterally moving said latter sight member to align with said light and the image thereof on the cornea of said second eye, then measuring in said common plane, from the plane of said pair of sight members to the median line between said pair of eyes and to the sight member before the second eye, whereby said total measurement represents the interaxiallary distance for the then existing fixation distance and said measurement to said median represents the axiallary distance of said first eye at non-convergence.

7. The method of determining the interaxiallary distance of a pair of eyes; which comprises locating a vertical plane common to said pair of eyes and forwardly thereof, sighting parallel to said plane and tangent to the cornea to locate a second plane, measuring the distance between said planes to determine the relative position of the first said plane in which the interaxiallary distance is to be measured, placing a suitable light at the fixation point of said pair of eyes thereby to form on the cornea of each eye of said pair a reflected image of said light, sighting from the fixation distance to each of said images alternately and measuring in the first said plane the apparent separation of said images.

8. The method of simultaneously determining the interaxiallary distance of a pair of eyes at convergence and the axiallary distance of one of said eyes at non-convergence; which comprises locating a vertical plane common to said pair of eyes and forwardly thereof, sighting parallel to said plane and tangent to the cornea to locate a second plane, measuring the distance between said planes to determine the relative position of the first said plane in which the measurements are to be made, employing a suitable light as a fixation point for said eyes and to form a reflected image on the cornea of each of said eyes, determining the lateral position required to align said light and one of said images in a vertical plane at right angles to the first said plane, then sighting from a vertical extension of said light to said image thereof on the cornea of the second eye to locate a line intersecting the first said plane, then measuring in the first said plane the distance from said right angle plane to the median of said pair of eyes and to the intersection of said line with the first said plane, whereby said total measurement represents the interaxiallary distance for the then existing fixation distance and said measurement to said median represents the axiallary distance of the non-convergent eye of said pair.

9. An ophthalmic appliance for determining pupillary distance; comprising a tubular lamp of substantial length, an opaque inclosure for said lamp; said inclosure having a longitudinal slit of substantially the length of the lamp and a sight opening aligned with said slit, said lamp and slit being of sufficient length to produce on the cornea of the human eye a readily visible image appearing as a streak of light.

10. An ophthalmic appliance for determining pupillary distance; comprising an elongated opaque tube, fitted to a detachable handle; a longitudinal slit in said tube, a second slit or sight opening being an interrupted continuance of the first mentioned slit; an opaque septum in the tube at the point of said interruption, a lamp within said tube, said lamp and the first said slit being of sufficient length to produce on the cornea of the human eye a readily visible image appearing as a streak of light.

11. Ophthalmic apparatus for determining pupillary distance, comprising a pair of sights adapted to locate a vertical plane at right angles to a vertical plane common to a pair of eyes, luminous slit adapted to be positioned in the vertical plane of said sights and between the operator and said sights, said slit and said sights being laterally movable to the respective positions required to align the corneal image of said luminous slit with said sights and with said luminous slit, to thereby locate the vertex of that cornea when such eye is fixing upon said luminous slit; whereby, when the corneal vertices of said pair of eyes are thus located, the interval therebetween may be measured in any conventional manner.

12. Ophthalmic apparatus for determining pupillary distance, comprising an annular member having a pair of aligned sights spaced apart and intersecting its axis, a gauge mounted parallel to said axis and a pair of sights upon said gauge for sighting in a plane normal to said gauge and said axis.

13. Ophthalmic apparatus for determining pupillary distance, comprising a member adapted to fit in the lens holder of a conventional trial frame, said member carrying a pair of sights for locating a vertical plane normal to the plane of said lens holder, said member carrying a pair of sights for locating a plane parallel to said lens holder, and said member carrying a gauge for measuring the interval between two planes parallel to said lens holder when assembled thereon.

14. Ophthalmic apparatus for determining pupillary distance, comprising a pair of aligned sights, a light adapted to be aligned with said sights, and an aiming device disposed in a plane at right angles to the plane of said sights.

15. Ophthalmic apparatus for determining pupillary distance, comprising a pair of aligned sights, a luminous slit adapted to be aligned with said sights, and an aiming device disposed in a plane at right angles to the plane of said sights.

16. Ophthalmic apparatus for determining pupillary distance, comprising a tube having a peripheral flange adapted to engage with the lens-holder of a conventional trial frame and a pair of aligned sights spaced apart in the same plane and intersecting the axis of said tube.

17. Ophthalmic apparatus for determining pupillary distance, comprising a tubular member having a peripheral flange adapted to engage with the lens-holder of a conventional trial frame, aligned sights spaced apart in the same plane and intersecting the axis of said tubular member, and an aiming device disposed in a plane parallel to said flange.

18. Ophthalmic apparatus for determining pupillary distance, comprising an annular collar, a flanged tube, aligned sights spaced apart in the same plane and intersecting the axis of said tube, a filler member having a plate portion, said collar being adapted to alternately engage with said filler member and with said tube, means for causing of the external plane of said plate portion to register with a designated plane of said collar, and means for causing of one of the sights in said tube to register with said designated plane, whereby said plate portion and one of the sights in said tube are alternately employed to locate the same designated plane of said collar, and an aiming device disposed in a plane parallel to the plane of said collar.

19. Ophthalmic apparatus for determining pupillary distance, comprising an annular collar, a flanged tube, aligned sights spaced apart in the same plane and intersecting the axis of said tube, a filler member having a plate portion, said collar being adapted to alternately engage with said filler member and with said tube, means for registering coincidence of the external plane of said plate portion with a designated plane of said collar, and means for registering coincidence of one of the sights in said tube with said designated plane, whereby said plate portion and one of the sights in said tube are alternately employed to locate the same designated plane of said collar.

20. Ophthalmic apparatus for determining pupillary distance, comprising a light source adapted to be positioned at the fixation point of a pair of eyes so as to form duplicate images one on each cornea of said pair of eyes, a vertical sight line for each eye of said pair, each of said sight lines adapted to be aligned with said light source and the image thereof reflected on the cornea of each respective eye of said pair and with said sight lines at the same distance from the respective eyes of the pair, whereby when said sight lines are aligned as aforesaid and the light source is the fixation point of said pair of eyes, the distance between said sight lines is the interaxiallary distance of that pair of eyes for convergence at the then existent fixation distance when measured in the plane occupied by said sight lines.

21. Ophthalmic apparatus for determining pupillary distance, comprising a light source adapted to be positioned at the fixation point of a pair of eyes so as to form duplicate images one on each cornea of said pair of eyes, a vertical sight line for each eye of said pair, each of said sight lines adapted to be aligned with said light source and the image thereof reflected on the cornea of each respective eye of said pair and with said sight lines at the same distance from the respective eyes of the pair, whereby when said sight lines are aligned as aforesaid and the light source is the fixation point of said pair of eyes, the distance between said sight lines is the interaxiallary distance of that pair of eyes for convergence at the then existent fixation distance when measured in the plane occupied by said sight lines; an aiming device adapted to locate a plane parallel to the plane of said sight lines and tangent to the cornea of each eye of said pair, and a graduated scale adapted to measure the distance between said parallel planes.

22. Ophthalmic apparatus for determining pupillary distance, comprising a slidable gauge carrying aligned members for sighting transversely normal to said gauge, a second pair of aligned members for sighting parallel to said gauge, and a light source adapted to be aligned with said second sighting members; whereby, when said light source is positioned at a spaced distance before a human eye using said light source as a fixation point, and when said second sighting members lie in a vertical plane corresponding to the visual axis of that eye at nonconvergence, the image of said light source reflected upon the cornea of that eye will be aligned with said second sighting members when said light is also aligned with said second sighting members, and said image will be situated on the corneal apex of that eye, and when the other of the pair of eyes also fixes upon said light source, a like image will also be reflected upon the apex of its cornea; said gauge being slidably adjustable to position the first sighting members in alignment with the corneal apex of the nonconvergent eye and to measure the distance therefrom to the rearmost member of said second sighting members, a third sighting member adapted to be positioned before the other eye of the pair aforesaid and at the same distance from that eye as the measurement aforementioned; whereby said third sighting member and the rearmost member of said second pair of sighting members identify a plane in which the interval between the visual axes of said eyes is to be measured, and whereby when said third sighting member is aligned with said light source and the image thereof on the convergent eye the interval between said third sighting member and the rearmost member of said second sighting members aligned with the nonconvergent eye as aforesaid is the interaxiallary distance for convergence to the fixation distance of the light source when measured in a plane at the then existent distance from said pair of eyes as determined by said gauge as aforesaid, and whereby the lateral position of the nonconvergent eye can be determined by measuring from the plane identified by said second pair of sights to the median plane situated equidistant between said pair of eyes.

ORVAL W. LEE.